United States Patent [19]

Balke et al.

[11] 4,425,519

[45] Jan. 10, 1984

[54] CRACK RESISTANT ARMOR TERMINATION FOR POLE FACE WINDING BARS

[75] Inventors: Roy L. Balke; Martin A. Zgraggen, both of Erie, Pa.

[73] Assignee: General Electric Company, Research Triangle Park, N.C.

[21] Appl. No.: 486,502

[22] Filed: Apr. 19, 1983

[51] Int. Cl.³ .............................................. H02K 15/12
[52] U.S. Cl. ...................................... 310/45; 310/201
[58] Field of Search .................. 310/42, 45, 177, 179, 310/201, 208, 214, 215, 260, 270

[56] References Cited

U.S. PATENT DOCUMENTS

| | | | |
|---|---|---|---|
| 2,707,204 | 4/1955 | Richardson et al. | 310/45 |
| 2,989,657 | 6/1961 | Sampson | 310/45 X |
| 4,001,616 | 1/1977 | Lonseth et al. | 310/45 |
| 4,308,476 | 12/1981 | Schuler | 310/45 |
| 4,345,175 | 8/1982 | Jones | 310/45 |

*Primary Examiner*—Mark O. Budd
*Attorney, Agent, or Firm*—Irving M. Freedman; Vale P. Myles

[57] ABSTRACT

A band of fabric over the interface between the slot armor and the copper bar of a pole face winding is both resistant to migration of conductive contaminants under the edge of the slot armor and hospitable to the application and retention of an insulating paint layer over such interface. The band of fabric is preferably of woven glass fiber with a tenacious pressure sensitive adhesive on one side and with the other side bare. The adhesive is compatible with the material of the slot armor, sticks readily to the copper bar and to the bare surface of the woven glass fiber fabric band. The bare side of the fabric provides a good mechanical bond to the insulating paint layer and thereby encourages the establishment and retention of an unbroken paint layer over the interface. The combination provides a long electrical leakage current path between the copper bar and the iron of the pole.

5 Claims, 4 Drawing Figures

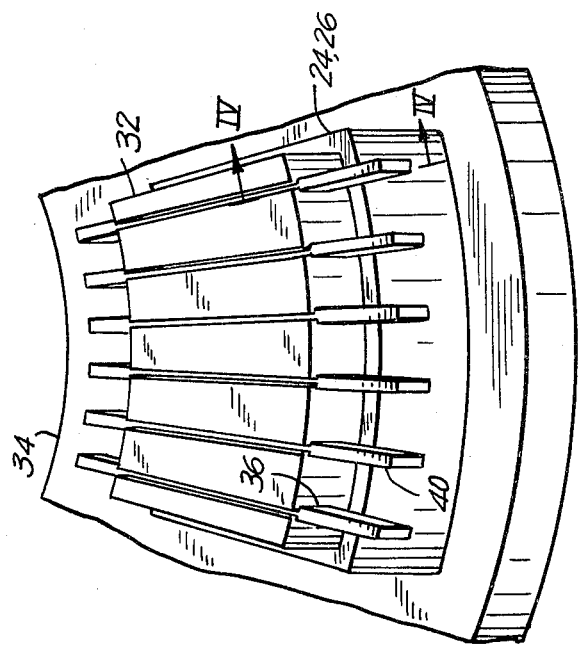
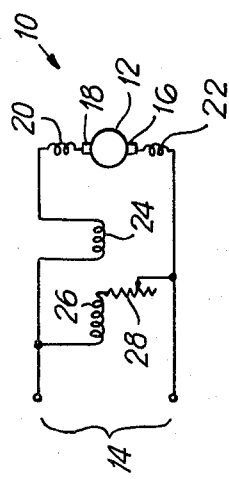
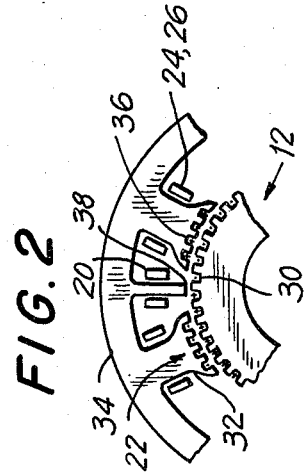

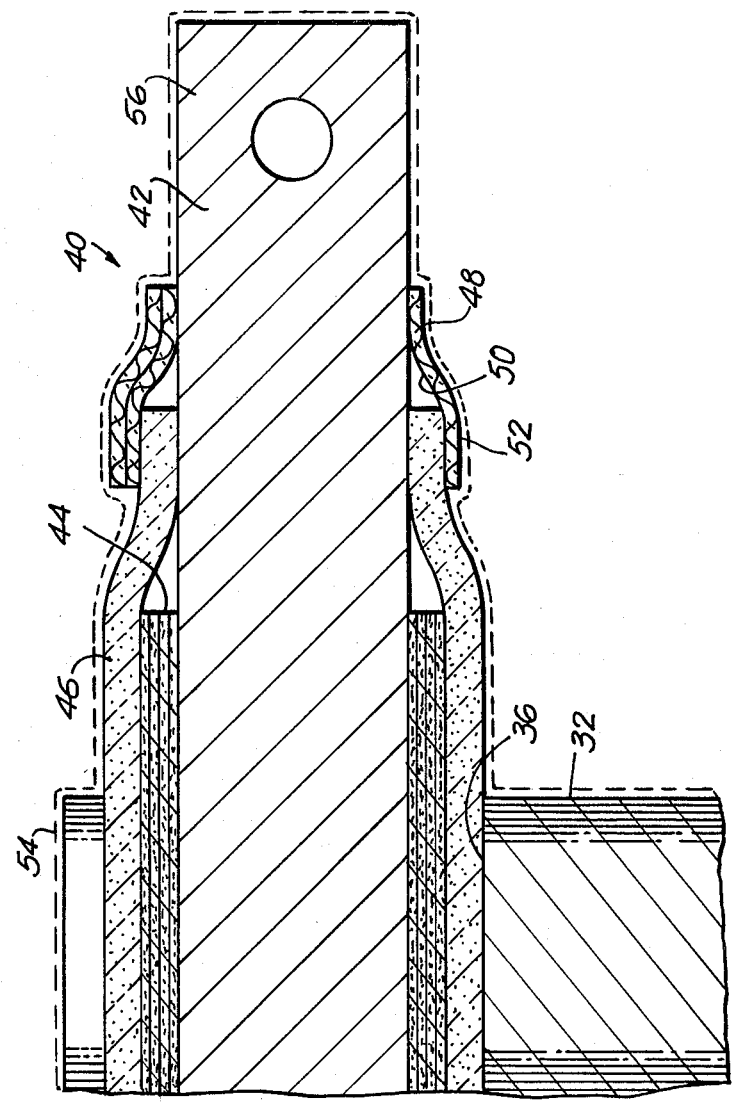

CRACK RESISTANT ARMOR TERMINATION FOR POLE FACE WINDING BARS

BACKGROUND OF THE INVENTION

The present invention relates to rotating machinery and, more particularly, to large DC rotating machinery.

DC motors and generators conventionally include stationary field windings on a stator surrounding armature windings rotatably disposed on a rotor. A commutator affixed to the rotor has a plurality of copper bars arranged into a cylinder to provide electrical connection to individual ones of the armature windings on the rotor. A plurality of stationary carbon brushes make sliding contact with the commutator for connecting power to (in the case of a motor) or connecting power from (in the case of a generator) the armature windings. The brushes and commutator effectively switch the power connections to the armature windings in a manner effective to maintain the magnetic poles of the armature at an electrical angle of about 90 degrees to the magnetic poles of the field windings. The resulting quadrature of the two magnetic fields produces the power when the machine is driven as a generator and produces the torque when the machine is run as a motor.

One of the most important limitations on the capability of a DC machine is the ability to transfer the necessary armature current through the brush-commutator interface without destructive sparking which may result in rapid loss of both brush and commutator material. The physical processes taking place at the interface between a copper commutator bar moving with respect to a carbon brush, although they are very old and almost universally used in DC machinery, are not well understood. The brushes are positioned so that they pass from one commutator bar to the next at the time that the associated armature windings are located at the midpoint between adjacent magnetic poles of the stator. If the stator were the only source of magnetic flux on the armature, this positioning should permit switching to take place while the coils being switched are at zero volts. However, other sources of magnetic flux are present. The principal one for present purposes is the magnetic flux due to the current in the armature itself. The armature flux, being physically in quadrature with the field flux, adds to the field flux in some locations and subtracts in other. Because of nonlinear saturation of the iron, the additive and subtractive flux contributions are unequal and, as a consequence, the net magnetic flux in the air gap midway between magnetic poles of the field does not go to zero when an armature winding moves past this location but instead a substantial flux on one polarity is present in the air gap midway between alternate pairs of field poles and a flux of the other polarity is present between the remaining pairs of poles. This effect produces a substantial voltage between the commutator bars and the brushes during commutation and leads to sparking. Such sparking is acceptable in small capacity DC machines but is fatal to brushes and commutators in larger machined.

In larger DC machines, the flux contribution produced by current in the armature windings during the short period while the brushes are passing from one commutator bar to another is cancelled by a commutating or interpole winding located midway between adjacent field poles. The commutating winding is cnnected in series with the armature current so that the cancellation is correct at all loads and speeds.

For large DC machines subjected to heavy overloads, rapidly changing loads or operation with a weak field, a further phenomenon can lead to commutator flashover. The brush-copper interface produces a surface condition which is similar to a gas plasma. This surface condition is favorable to breakdown between adjacent commutator bars under an applied voltage. Consequently, a maximum allowable voltage between adjacent commutator bars is on the order of 30 or 40 volts. Under transient conditions of changing load, or under high steady load, the distortion of the magnetic flux distribution in the air gap between the field and armature windings contributed by armature current may permit voltages to be induced in the armature windings connected to adjacent commutator bars that are sufficiently high to initiate arcing or flashing between the commutator bars. Flashing between commutator bars may quickly spread around the entire commutator and, in addition to the destructive effect this may have on the commutator, it also acts as a dead short across the line.

To counter the flashover problem, pole face windings are provided in the face of the stator poles. These pole face windings consist to conductive bars disposed in slots in the iron of the stator poles and connected in series with the armature current. The axis of the magnetic flux produced by the pole face windings is of opposite polarity and aligned with the axis of the magnetic flux of the armature. Thus, properly sized and positioned pole face windings are capable of cancelling the flux contibution of the armature current and thus provide relatively close control of the magnetic flux in the entire air gap between the field windings and the armature. This permits reducing the flux distortion in the air gap to a low enough value to reduce or eliminate flashing even under severe operating conditions favorable to its initiation.

As noted above, pole face windings are conductive bars disposed in slots in the field poles. Since the bars of the pole face windings must be connected in series with the armature current, these bars are maintained at the applied line voltage. The field poles are customarily grounded. Thus insulation is required between the bars and the iron on the field poles. Such insulation is provided by an insulating layer about the bars. The insulating layer is protected from damage by a hard, damage-resistant slot armor between it and the iron of the field pole. Such insulation and slot armor is disclosed in U.S. Pat. Nos. 3,454,804 and 3,801,392. The '804 patent also discloses an insulation on the end turns external to the slot.

In more modern practice, the insulating layer is a multiple-layer wrapping of a high-temperature non-woven polyamide paper such as, for example, Nomex manufactured by the DuPont company. The polyamide paper layer extends beyond the slot at both ends of the field pole. A wrapping of a glass fabric tape impregnated with partially cured resin over the polyamide paper is shaped and heat cured to provide a damage-resistant armor. The armor layer extends beyond the polyamide paper at both ends of the bar and is conformed as closely as possible to the surface of the bar in order to reduce the entry of comtaminants, and particularly conductive contaminants, therebetween.

It is desirable to achieve as low an electrical leakage current as possible between the filed iron and the pole face bars. This is sometimes difficult to achieve since the operating environment often contains conductive particles such as, for example, carbon dust from the brushes or a conductive ore, which can adhere to the surface of the slot armor and reduce the resistance between field pole and pole face bars to as low as, for example, 25 to 50 Kilohms. Many large DC machines include trip circuits which are occasionally actuated by leakage resistance of this magnitude to produce nuisance trips which thereupon require analysis and resetting. Lower electrical leakage current is achieved when as long an electrical leakage current path as possible is provided between the pole face bars and the iron of the field.

The length of the electrical leakage path is reduced significantly if conductive materials find their way into a space between the armor and the pole face bar. Unfortunately, conventional armor materials do not adhere well to the copper metal of which pole face bars are conventionally made. Furthermore, once cured, the armor becomes a rigid body having a temperature coefficient of expansion which is substantially different from the copper pole face bars. This, of course, encourages the formation of a gap between the armor and the copper into which conductive contaminants can migrate. When this problem is combined with the formation of a conductive contaminant coating on the outer surface of the armor, relatively short electrical leakage current paths rapidly develop. Combatting the resulting low leakage resistance has required substantial maintenance labor to clean the conductive contaminant layer from the outer surface of the armor. Even with the expenditure of substantial maintenence labor, this technique is sometimes only marginally successful.

In a further attempt to achieve long electrical leakage current paths it has become common to apply a uniform coating of paint such as, for example, polyurethane enamel paint, using, for example, electrostatic painting techniques to the entire surface of the field pole iron, the surfaces of the armor extending therebeyond and the surfaces of the copper bars extending beyond the armor. The paint layer may also be applied to the surfaces of the end turns which are used to interconnect the ends of the pole face bars. Unfortunately, the paint layer has been found to develop a crack at the end of the armor. Such a crack permits the migration of conductive contaminants therethrough and into the gap that forms between the pole face bar and the armor. This substantially subverts the attempt to increase the electrical leakage current path length by the addition of the paint layer since the electrical leakage current path from the field pole iron to the pole face bar begins at the end of the armor as it did without the paint coating.

A heat-shrinkable Mylar tube was used for bridging the end of the armor to the surface of the pole face bars. It was found that, not only does paint not adhere well to the surface of Mylar, but also conductive contaminants were still able to migrate under the Mylar tube. Furhtermore, even surface cleaning of the Mylar was unsuccessful in stopping the leakage.

OBJECTS AND SUMMARY OF THE INVENTION

Accordingly, it is an object of the invention to provide apparatus for overcoming the electrical leakage current problems of the prior art.

It is a further object of the invention to provide a seal between the end of a slot armor and a metallic bar.

It is a further object of the invention to provide a bridge over the end of a slot armor which accepts a coating of insulating paint and seals against entry of contaminants under the slot armor.

According to an embodiment of the invention, there is provided a pole face winding bar comprising a metallic conductor, an insulating layer covering a central portion of the metallic conductor, a slot armor covering the insulating layer and extending beyond first and second ends of the insulating layer onto the metallic conductor, the slot armor being a resin-impregnated woven glass fiber tape wherein the resin is cured to provide a protective coating for the insulating layer, at least a first strip of glass cloth tape wound in excess of one full turn about an interface between a first end of the slot armor and the metallic conductor, the first strip of glass cloth tape overlying a substantial portion about a full perimeter of the slot armor, the first strip of glass cloth tape extending beyond the first end and overlying a substantial portion about a full perimeter of the metallic conductor, the first strip of glass cloth tape overlapping itself in a portion of winding exceeding one full turn, the first strip of glass cloth including an adhesive on a first surface and a bare glass fiber fabric on a second surface thereof, the adhesive including means compatible for forming a tenacious bond with the slot armor, the metallic conductor and the second surface, the adhesive and the strip of glass cloth tape being effective to prevent entry of contaminants between the slot armor and the metallic conductor, and the bare glass fiber fabric being effective to provide a surface which is favorable for retaining a layer of an insulating paint thereon which is continuous from the slot armor to the metallic conductor and effective to resist cracking of the layer at interfaces therof.

According to a feature of the invention, there is provided an insulation system for a DC machine of the type having compensating windings in slots in a pole face thereof, the compensating windings including conductor bars, comprising a polyamide paper wound on a central portion of each of the conductor bars, a length of the central portion exceeding a length of the slots whereby the polyamide paper extends beyond first and second ends of the pole face, a continuous layer of a first glass cloth tape impregnated with a thermosetting resin wound over the polyamide paper and extending onto the conductor bars beyond first and second ends of the polyamide paper, the thermosetting resin being cured to form a slot armor, a second glass cloth tape having a pressure sensitive adhesive on a first surface therof and a bare glass cloth surface on a second surface thereof, the second glass cloth tape being wound in excess of one full turn about a circumference of the conductor bar with one portion thereof encircling and adhering to an outer end of the continuous layer and a contiguous second portion thereof encircling and adhering to an outer peripheral surface of the conductor bar, an overlap portion of the second glass cloth tape wherein the pressure sensitive adhesive on the first surface adheres to the bare glass cloth surface, and a layer of insulating paint covering an exterior surface of the pole piece, a portion of the slot armor extending beyond the pole piece, the second glass cloth tape and a portion of the conductor bar extending beyond the second glass cloth tape whereby a long electrical leakage current path is provided between the conductor bar and the pole piece.

Briefly stated, the present invention provides a band of fabric over the interface between the slot armor and the copper bar of a pole face winding which is both resistant to migration of conductive contaminants under the edge of the slot armor and hospitable to the application and retention of an insulating paint layer over such interface. The band of fabric is preferably of woven glass fiber with a tenacious pressure sensitive adhesive on one side and with the other side bare. The adhesive is compatible with the material of the slot armor, sticks readily to the copper bar and to the bare surface of the woven glass fiber fabric band. The bare side of the fabric provides a good mechanical bond to the insulating paint layer and thereby encourages the establishment and retention of an unbroken paint layer over the interface.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a schematic diagram of a compound DC machine including commutating and pole face compensating windings which may employ the present invention.

FIG. 2 is a simplified end view of a DC machine employing commutating and pole face compensating windings which may employ the present invention.

FIG. 3 is a perspective view of a field pole showing pole face winding bars in slots in the field pole iron.

FIG. 4 is a cross section taken along IV—IV of FIG. 3.

DETAILED DESCRIPTION OF THE PREFERRED EMBODIMENT

Although the present invention is applicable to all types of large DC machines including those with series, shunt and separately excited field windings, for concreteness, an illustrative example of a DC motor employing a compound field winding is chosen for the description which follows.

Referring now to FIG. 1 there is shown, generally at 10, a compound DC motor which represents the environment in which the present invention is employed. An armature 12 is shown receiving power from, or delivering power to, a DC line 14 through carbon brushes 16 and 18. As is conventional, the orientation of the magnetic pole in armature 12 is aligned with an axis through brushes 16 and 18. A commutating winding 20 is connected in series with the DC power fed to brush 18.

A compensating or pole face winding 22 is connected in series with DC power fed to brush 16. It will be noted that commutating winding 20 and compensating winding 22 both have their axes aligned with the axis of armature 12. The direction of current flow in these windings is arranged so that the magnetic flux developed therein is of opposite polarity to that developed by current in armature 12 to thereby cancel the magnetic flux produced by current in armature 12.

A series field winding 24 is connected in series with the armature current fed from DC line 14 to armature 12. A shunt field winding 26 is connected in series with a shunt field control rheostat 28 across DC line 14. As is convnetional, series and shunt field windings 24 and 26 are shown with their axes at 90 degrees to the axes of armature 12, commutating winding 20 and compensating winding 22.

Referring now to FIG. 2, individual windings in armature 12 are disposed in slots 30 in its peripheral surface. A plurality of pole pieces 32, which are conventionally assembled of a plurality of laminations, are physically and magnetically connected to a magnet frame 34 which provides a return path for magnetic flux therebetween. Field windings 24 and 26 are wound on pole piece 32. A plurality of slots 36 in pole piece 32 contain compensating windings 22. It will be recalled that compensating windings 22 receive the full DC supply voltage which conventionally has a maximum in the range of from about 375 to about 700 volts but may be as high as about 1300 or more volts in special applications. Pole pieces 32 are conventionally at electrical ground. Thus substantial efforts are made to provide good insulation between compensating windings 22 and pole pieces 32 to provide as long an electrical leakage current path as possible therebetween. Commutating winding 20 is shown wound on a commutating pole piece 38 disposed midway between adjacent pole pieces 32.

Referring now to FIG. 3, field windings 24,26 are shown on pole piece 32 mounted in magnet frame 34 but with armature 12 and other elements omitted to reduce clutter in the figure. Slots 36 are seen to each contain a bar 40 which extends for a substantial distance beyond the ends of pole piece 32. The ends of bars 40 are conventionally interconnected by end turns in a predetermined pattern with bars in other pole pieces (not shown in FIG. 3) to align the magnetic axis produced by current flowing therein in a direction opposite to that produced by current in armature 12 (not shown in FIG. 3). The end turns are also omitted from FIG. 3 in the interest of clarity.

Referring now to FIG. 4, bar 40 includes a copper conductor 42, conventionally of rectangular cross section. The thickness of materials on bar 40 are greatly exaggerated. An insulating layer 44 which may be, for example, preferably about three or four plies, of a polyamide paper, covers the portion of copper conductor 42 dispposed in slot 36 and extends outward a substantial distance beyond. The polyamide paper of insulating layer 44 preferably includes a pressure sensitive adhesive on one of its surfaces that forms a tenacious bond to copper conductor 42 and to itself. In the preferred embodiment, the adhesive is a pressure sensitive acrylic adhesive.

A slot armor 46 covers insulating layer 44 and extends outward onto copper conductor 42 beyond the ends of insulating layer 44. Slot armor 46 is preferably laid up of a half-lapped winding of a woven glass fiber tape impregnated with a B-stage partially cured thermosetting resin. In the preferred embodiment, slot armor 46 is formed of a three-quarter-inch wide glass cloth tape impregnated with a polyester resin that is compatible with the polyamide paper of insulating layer 44. One type of material which may be used is Fusa-Fab treated glass cloth produced by the General Electric Company.

In order to secure the end of slot armor 46 to the surface of copper conductor 42, to prevent the entry of contaminants and to provide a surface which is hospitable to an insulating coating of paint, a glass cloth tape 48 is woundin one or two turns, preferably one full turn plus a fraction of a turn for overlap of its ends, to bridge from the surface jof slot armor 46 to the surface of copper conductor 42. An inner surface 50 of glass cloth tape 48 is coated with a pressure sensitive adhesive that provides a tenacious bond to copper conductor 42, is compatible with insulating layer 44 and bonds to an outer surface 52 of itself. Although the pressure sensitive adhesive may be of any convenient type, in the preferred embodiment a thermosetting acrylic pressure sensitive adhesive is employed. Glass cloth tape 48 is preferably a straight weave cloth having outer surface 52 bare and uncoated. Outer surface 52 is therefore favorable to adhesion by the pressure sensitive adhesive on inner surface 50. This simplifies application since glass cloth tape 48 may be wund onto copper conductor tape 42 and then overlapped on itself for at least a part of a turn. The bare glass fibers of outer surface 52 provide a rough surface conducive to a good mechanical bond with an insulating layer of paint, indicated by a dashed line 54, applied over athe entire exposed surfaces of the elements shown in FIG. 4 not including, of course, a clamping region 56 of copper conductor 42 which is employed for electrical and mechanical connection to an end turn (not shown). The paint layer is, in fact, applied after assembly of the end turns to bar 40 and covers the exterior of the end turns as well.

After insulating layer 44, slot armor 46 and glass cloth tape 48 are laid up in the manner shown and preferably before installation of bar 40 in slot 36, the resin inslot armor 46 is cured under suitable heat and mechanical pressure for a sufficient time to develop the required toughness and durability in slot armor 46. If the pressure sensitive adhesives in insulating layer 44 and glass cloth tape 48 are resins of the thermosetting type, they are chosen to have a curing time and temperature that is compatible with the resin of slot armor 46 so that the entire assembly of bar 40 may be cured at the same time. Glass cloth tape 48 may thereby be resin bonded to slot armor 46 for producing a continuous crack-resistant interface therebetween.

Glass cloth tape 48 preferably has a thin cross section to present as small a height discontinuity at its interfaces with slot armor 46 and copper conductor 42 and is tenaciously adhered to slot armor 46 and copper conductor 42 so that insulating layer of paint 54 can smoothly cover from one to another. The use of an acrylic resin on inner surface 50 imparts substantially flexibility to glass cloth tape 48 to permit it to absorb relative motion between slot armor 46 and copper conductor 42 withourt encouraging cracking in overlaying insulating layer of paint 54. Bare outer surface 52 provides a roughness which permits a good mechanical key to a paint layer and therefore is favorable to a long paint life. Thus a continuous crack-free coating of paint is achievable and a long electrical leakage current path is provided.

Having described specific preferred embodiments of the invention with reference to the accompanying drawings, it is to be understood that the invetion is not limited to those precise embodiments, and that various changes and modifications may be effected therin by one skilled in the art without departing from the scope or spirit of the invention as defined in the appended claims.

What is claimed is:

1. A pole face winding bar comprising:
   a metallic conductor;
   an insulating layer covering a central portion of said metallic conductor;
   a slot armor covering said second ends of said insulating layer onto said metallic conductor;
   said slot armor being a resin-impregnated woven glass fiber tape wherein said resin is cure to provide a protective coating for said insulating layer;
   at least a first strip of glass cloth tape wound for in excess of one full turn about an interface between a first end of said slot armor and said metallic conductor;
   said first strip of glass colth tape overlying a substantial portion about a full perimeter of said slot armor;
   said first strip of glass cloth tape extending beyond said first end and overlying a substantial portion about a full perimeter of said metallic conductor;
   said first strip of glass cloth tape overlapping itself in a portion of winding exceeding one full turn;
   said first strip of glass cloth including an adhesive on a first surface and a bare glass fiber fabric on a second surface thereof, said adhesive including means compatible for forming a tenacious bond with said slot armor, said metallic conductor and said second surface;
   said adhesive and said strip of glass cloth tape being effective to prevent entry of contaminants between said slot armor and said metallic conductor; and
   said bare glass fiber fabric being effective to provide a surface which is favorable for retaining a layer of an insulating paint thereon which is continuous from said slot armor to said metallic conductor and effective to resist cracking of said layer at interfaces thereof.

2. A pole face winding bar according to claim 1 wherein said strip of glass cloth tape is a woven strip of glass cloth tape.

3. A pole face winding bar according to claim 1 wherein said adhesive is thermosetting adhesive.

4. A pole face winding bar according to claim 3 wherein said resin in said slot armor is a thermosetting resin and said thermosetting resin on said strip of glass cloth tape is curable under the same temperature and time conditions as those effective to cure said resin in said slot armor whereby a resin bond is developed between said armor and said glass cloth tape, said resin bond being effective to resist cracking at an interface thereof.

5. An insulating system for a DC machine of the type having compensating windings in slots in a pole face thereof, said compensating windings including conductor bars, comprising:
   a polyamide paper wound on a central portion of each of said conductor bars, a length of said central portion exceeding a length of said slots whereby said polyamide paper extend beyond first and second ends of said pole face;
   a continuous layer of a first glass cloth tape impregnated with a thermosetting resin wound over said polyamide paper and extending onto said conductor bars beyond first and second ends of said polyamide paper, said thermosetting resin being cured to form a slot armor;
   a second glass cloth tape having a pressure sensitive adhesive on a first surface thereof and a bare glass cloth surface on a second surface thereof, said second glass cloth tape being wound in excess of one full turn about a circumference of said conductor bar with one portion thereof encircling and adhering to an outer end of said continuous layer and a continuous second portion thereof encircling and adhering to an outer peripheral surface of said conductor bar;

an overlap portion of said second glass cloth tape wherein said pressure sensitive adhesive on said first surface adheres to said bare glass cloth surface; and a layer of insulating paint covering an exterior surface of said pole piece, a portion of said slot armor extending beyond said pole piece, said second glass cloth tape and a portion of said conductor bar extending beyond said second glass cloth tape whereby a long electrical leakage current path is provided between said conductor bar and said pole piece.

* * * * *